(No Model.)

C. FORSCHNER.
SPRING SCALES.

No. 264,070. Patented Sept. 12, 1882.

WITNESSES
W. A. Jones.
Agnes E. Brown.

INVENTOR,
Charles Forschner,
By his Attorney
J. S. Brown.

UNITED STATES PATENT OFFICE.

CHARLES FORSCHNER, OF NEW YORK, N. Y.

SPRING-SCALE.

SPECIFICATION forming part of Letters Patent No. 264,070, dated September 12, 1882.

Application filed November 29, 1881. (No model.)

*To all whom it may concern:*

Be it known that I, CHARLES FORSCHNER, of the city, county, and State of New York, have invented an Improved Spring-Scale; and I do hereby declare that the following is a full and exact description thereof, reference being had to the accompanying drawings, making part of this specification—

Figure 1:
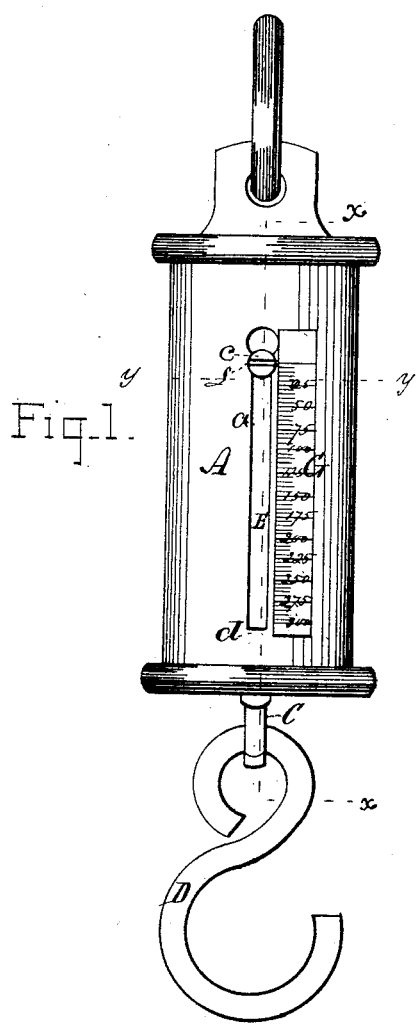
Figure 2:
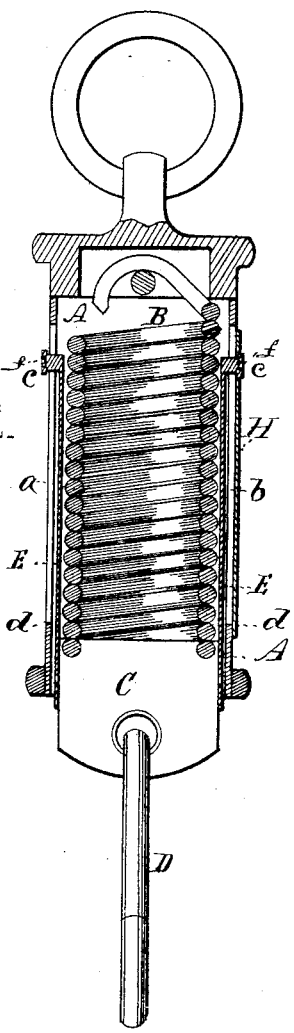
Figure 3:
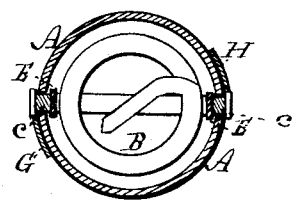

Figure 1 being a side view of the improved spring-scale; Fig. 2, a vertical section thereof in a plane indicated by the line $x\ x, x\ x$, Fig. 1; Fig. 3, a cross-section of the same in a plane indicated by the line $y\ y$, Fig. 1.

Like letters designate corresponding parts in all of the figures.

My improvements are specially adapted to spring ice-scales and others constructed for weighing heavy articles or substances; but they are or may be useful to a greater or less degree in balances for other uses. For the uses specially designated above the spring is often subjected to heavy strain, liable frequently to have loads suspended from it heavier than the balance can weigh, thus bringing it forcibly to the stop which limits the weight. My first improvement is designed to guard against the breaking of the spring under such circumstances.

The accompanying drawings represent a tubular ice-scale constructed according to my invention, A representing the tubular body or case; B, the spring; C, the slide-plate to which the lower end of the spring is attached, and from which the suspending-hook D is hung.

Instead of a single runner, E, attached to the plate C, as usual, I employ two runners, E E, at opposite sides of the tubular body or case A, and make two vertical opposite slots, $a\ b$, in the body, in which run respectively guide-stops $c\ c$, secured one to each runner, near the upper end thereof. When these stops reach the lower ends, $d\ d$, of the respective slots the weight can descend no farther, and the spring can be stretched no more. Now, if the weight on the suspending-hook D is greater than the scale can weigh, or if the weight or load, though not too great to be weighed yet is violently hung upon the scale, there is great strain on the spring, and where only one slot, one runner, and one stop are used, not only is there danger that the stop or the runner may give way, and consequently endanger the spring, but, the stop being on one side, there is a lateral wrenching produced by pulling violently down on the unsupported side opposite to the stop. Thus the spring is frequently broken, even when the stop does not give way. By my invention, therefore, not only is the double safeguard of two stops obtained, but this lateral strain, due to the imperfection of one stop at one side, is entirely obviated. The security of my spring-scale is therefore apparent.

I take advantage of the slots and the two runners required for the above-specified improvement, or independently thereof, if desired, to make another improvement in these scales. I attach two index-plates, G H, or make two graduated scales to indicate the weights, one by the side of each vertical slot in the body or case of the spring-scale. There is a special advantage in this improvement above that of simple duplication, particularly for ice-scales. It is this, that while the seller is in or at the ice-wagon weighing the ice the purchaser on the opposite side of the spring-scale can observe the weight and satisfy himself of its correctness; and for other uses a similar advantage of observing on both sides of the scale at the same time is obtained, and thus, in addition to the ordinary result of a duplication in avoiding the necessity of turning the balance round, if the single-scale graduation happens to be turned to the opposite direction from the weigher, I gain a distinct useful purpose. The double-scale graduation here is used in connection with a single spring, and is claimed only in this connection to indicate the same weight at the same time on opposite sides of the balance.

I make also an improvement in the index or pointer which indicates the weight on the scale, especially useful in balances or scales subjected to violence or rough treatment, as in the case or for the purposes above indicated.

Instead of the usual pointer, which, by projecting through the slot, is liable to be broken off or bent out of proper position, I make in the face of the guide-stop $c$, which slides in the slot of the body or case of the scale, a horizontal or equivalent notch or line, $f$, to indicate the weight. This stop, only projecting slightly beyond the case, and being sufficiently large and strong, is not liable to be broken or injured. It may be the nick of a screw-head, the screw forming the stop. The guide-stop is notched where it runs at the edges of the grooves, so as to hold the runner at each side of the case from swaying out of position inward or outward as well as laterally. Such notches, or their equivalent, may be formed by making a head on each guide-stop, as represented in the drawings, and particularly shown in Fig. 3. With my present invention, having two index-scale graduations, I of course have the same kind of index on both sides of the scale.

What I claim as my invention, and desire to secure by Letters Patent, is—

In a spring-scale, two runners, E E, and guide-stops c c, respectively, upon the upper ends of the said runners, and headed or notched at their sides, and having pointer-notches in their faces, in combination with two guide-slots, a b, in opposite sides of the case, in which the said guide-stops run, and with a graduated index-scale at the side of each slot, substantially as and for the purpose herein specified.

CHAS. FORSCHNER.

Witnesses:
  I. F. HENSCHOLE,
  WILLIAM H. CLEGG.